(12) United States Patent
Jiao et al.

(10) Patent No.: US 10,383,173 B2
(45) Date of Patent: Aug. 13, 2019

(54) METHOD, DEVICE AND SYSTEM FOR TRANSMITTING DATA PACKET

(71) Applicant: China Academy of Telecommunications Technology, Beijing (CN)

(72) Inventors: Bin Jiao, Beijing (CN); Li Chen, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 15/529,759

(22) PCT Filed: Nov. 13, 2015

(86) PCT No.: PCT/CN2015/094545
§ 371 (c)(1),
(2) Date: Aug. 31, 2017

(87) PCT Pub. No.: WO2016/082686
PCT Pub. Date: Jun. 2, 2016

(65) Prior Publication Data
US 2017/0359855 A1    Dec. 14, 2017

(30) Foreign Application Priority Data
Nov. 26, 2014    (CN) .......................... 2014 1 0692248

(51) Int. Cl.
*H04W 92/04* (2009.01)
*H04W 72/04* (2009.01)
(Continued)

(52) U.S. Cl.
CPC ..... *H04W 92/045* (2013.01); *H04W 72/0433* (2013.01); *H04W 72/12* (2013.01);
(Continued)

(58) Field of Classification Search
CPC ... H04W 92/045; H04W 92/00; H04W 92/04; H04W 72/04; H04W 72/0433; H04W 88/08
See application file for complete search history.

(56) References Cited

U.S. PATENT DOCUMENTS

2009/0135795 A1    5/2009 Lim et al.
2013/0088960 A1    4/2013 Bi et al.
(Continued)

FOREIGN PATENT DOCUMENTS

CN    102595373 A    7/2012
CN    103188761 A    7/2013
(Continued)

OTHER PUBLICATIONS

Agyapong Patrick et al: "Design considerations for a 5G network architecture", IEEE Communications Magazine, IEEE Service Center, Piscataway, US, vol. 52, No. 11, Nov. 1, 2014 (Nov. 1, 2014), pp. 65-75.

*Primary Examiner* — Blane J Jackson
(74) *Attorney, Agent, or Firm* — Foley & Lardner LLP

(57) ABSTRACT

Embodiments of the present application relate to the technical field of wireless communications, and in particular, to a method, a device and a system for transmitting a data packet, which are used to resolve the problem existing in the prior art that an LTE network structure causes a signaling burden on a backhaul between a radio access network and a core network and causes a transmission delay on the backhaul. In the embodiments of the present application, a control point sends a data packet that is from at least one base station to an access network gateway or a core network gateway; and a data packet that is from the access network gateway or the core network gateway is sent to the at least one base station, the control point being a connection control point of a terminal and a mobility control point of the (Continued)

terminal. In the embodiments of the present invention, a control plane signaling process of a core network of a new network architecture is greatly simplified; therefore, the control delay and traffic pressure on a Backhaul between an access network and a core network are reduced. Under the control of a control point, a transmission mode is flexibly selected at an access network side, so that requirements of different services on aspects of the delay and reliability can be met.

9 Claims, 13 Drawing Sheets

(51) Int. Cl.
*H04W 88/08* (2009.01)
*H04W 92/14* (2009.01)
*H04W 92/22* (2009.01)
*H04W 72/12* (2009.01)
*H04W 88/12* (2009.01)
*H04W 92/12* (2009.01)

(52) U.S. Cl.
CPC ........... *H04W 88/12* (2013.01); *H04W 92/14* (2013.01); *H04W 92/22* (2013.01); *H04W 92/12* (2013.01)

(56) References Cited

U.S. PATENT DOCUMENTS

| | | | |
|---|---|---|---|
| 2014/0050103 | A1 | 2/2014 | Niu et al. |
| 2015/0117408 | A1* | 4/2015 | Kedalagudde .... H04W 36/0027 370/331 |

FOREIGN PATENT DOCUMENTS

| | | |
|---|---|---|
| CN | 103458506 A | 12/2013 |
| CN | 103858372 A | 6/2014 |
| CN | 103889003 A | 6/2014 |
| CN | 103947257 A | 7/2014 |
| CN | 104125214 A | 10/2014 |

* cited by examiner

METHOD, DEVICE AND SYSTEM FOR TRANSMITTING DATA PACKET

This application is a US National Stage of International Application No. PCT/CN2015/094545, filed on Nov. 13, 2015, designating the United States, claims and claiming priority to Chinese Patent Application No. 201410692248.9, titled "Method, Device, and System for Transmitting Data Packet", filed with the Chinese Patent Office on Nov. 26, 2014, both of which are incorporated herein by reference in their entireties.

FIELD

The present invention relates to the field of wireless communications, and particularly to a method, device, and system for transmitting a data packet.

BACKGROUND

FIG. 1 is a schematic diagram of network architecture of LTE system.

A Mobility Management Entity (MME) and an eNB are connected via an S1-MME interface; an eNB completes the access network function and communicates with user equipment (UE) through an air interface. For each UE attached to the network, there is an MME serving it, which is referred to as the serving MME of the UE. An S1-MME interface provides control panel service for UE, including mobility management and bearer management functions.

A Serving GW (S-GW) and an eNB are connected via an S1-U interface, and for each UE attached to the network, there is an S-GW serving it, which is referred to as the serving S-GW of the UE. An S1-U interface provides user plane service for UE, and a data packet of the user plane of UE is transmitted between an S-GW and an eNB via an S1-U GTP (GTP, GPRS Tunneling Protocol; GPRS, General Packet Radio Service) bearer.

In the prior art, connection management function requires participation of mobility entity MME of a core network. An MME of the core network is usually deployed at a location quite far from access network element(s). Therefore, once UE's connection status changes, the signaling process will affect the core network, not only causing signaling burdens on the backhaul between the radio access network and the core network, but also introducing additional transmission delay of the backhaul between the radio access network and the core network.

In summary, the current LTE network structure will cause signaling burdens on the backhaul between the radio access network and the core network, as well as lead to transmission delay of the backhaul.

SUMMARY

The present invention provides a method, a device, and a system for transmitting a data packet, to solve the problem existing in the prior art that the current LTE network structure would cause signaling burdens on a backhaul between a radio access network and a core network and will lead to transmission delay of the backhaul.

A method for transmitting a data packet according to embodiments of the present invention, the method including:

transmitting, by a control node, a data packet from at least one base station to an access network gateway or a core network gateway; and transmitting, by the control node, a data packet from the access network gateway or the core network gateway to at least one base station;

where the control node is a connection control node and a mobility control node of a user equipment.

In a possible embodiment, the method further includes:
maintaining and protecting, by the control node, its connection with the user equipment and maintaining the connection status of the user equipment.

In a possible embodiment, the method further includes:
maintaining and storing, by the control node, location information of the user equipment, and updating the stored location information after the location information of the user equipment has changed.

In a possible embodiment, the method further includes:
authenticating, by the control node, the user equipment's identity via an interface between the control node and a core network subscription and authentication entity, and allocating a temporary user equipment identification which is unique in a system to the user equipment which is authenticated and is attached to the network.

In a possible embodiment, the method further includes:
after having established interface(s) with local gateway(s), performing, by the control node, local gateway selection of a user plane, and after having established interface(s) with core network gateway(s), performing, by the control node, core network gateway selection of the user plane.

In a possible embodiment, transmitting, by the control node, a data packet from the access network gateway or the core network gateway to at least one base station, includes:

for a unicast single-cell communication mode, forwarding, by the control node, the data packet from the access network gateway or the core network gateway to a base station;

for a unicast multi-cell communication mode or a broadcast communication mode, transmitting, by the control node, the data packet from the access network gateway or the core network gateway to at least one base station.

In a possible embodiment, for a unicast multi-cell communication mode, transmitting, by the control node, a data packet from the access network gateway or the core network gateway to at least one base station, includes:

transmitting repeatedly, by the control node, the data packet from the access network gateway or the core network gateway to at least two base stations; or replicating, by the control node, the data packet received, performing header compression and encryption processing on each replicated data packet, and then transmitting each replicated data packet to each base station, respectively, where each data packet is transmitted to a base station, or performing, by the control node, header compression and encryption processing on the data packet received, then segmenting the received data packet, and transmitting each segment of the data packet to a base station, where each segment of the data packet is transmitted to a base station, or, selecting, by the control node, a base station on the basis of situations of links between different base stations and the user equipment, and transmitting the data packet from the access network gateway or the core network gateway to the selected base station;

for a broadcast communication mode, transmitting, by the control node, the data packet from an access network gateway or a core network gateway to at least two base stations, includes:

replicating, by the control node, the data packet received and transmitting each replicated data packet to each base station, where each data packet is transmitted to one base station.

In a possible embodiment, transmitting, by the control node, a data packet from at least one base station to an access network gateway or a core network gateway, includes:

for the unicast single cell communication mode, transmitting, by the control node, the data packet from one base station to the access network gateway or the core network gateway;

for the unicast multi-cell communication mode, performing, by the control node, combination processing on the data packet from at least one base station and transmitting the data packet to the network gateway or the core network gateway.

In a possible embodiment, the control node transmits a data packet with a base station via Xn interface application protocol, and, the control node performs authentication, authorization, connection management, mobility management and session management of the user equipment through air interface high-level protocol.

Another method for transmitting a data packet according to embodiments of the present invention, the method including:

transmitting, by a base station, a data packet from a control node or an access network gateway to a user equipment, and transmitting, by the base station, a data packet from the user equipment to the control node or the access network gateway;

where the control node is a connection control node and a mobility control node of the user equipment.

In a possible embodiment, transmitting, by the base station, a data packet from a control node or an access network gateway to a user equipment, includes:

when performing multi-cell joint transmission, transmitting, by the base station, the data packet from the control node or the access network gateway to the user equipment according to transmission parameter(s) obtained from the control node, and transmitting the data packet from the user equipment to the control node or the access network gateway according to transmission parameter(s) obtained from the control node;

when performing single-cell transmission, transmitting, by the base station, the data packet from the control node or the access network gateway to the user equipment via self-scheduled transmission resource(s), and transmitting the data packet from the user equipment to the control node or the access network gateway via self-scheduled transmission resource(s).

In a possible embodiment, transmission resource(s) scheduled by the base station is different from resource(s) used for multi-cell joint transmission.

In a possible embodiment, the base station performs data packet transmission with the control node via Xn interface application protocol.

Another method for transmitting a data packet according to embodiments of the present invention, the method including:

receiving, by a user equipment, a data packet transmitted from a control node or an access network gateway via at least one base station, and transmitting, by the user equipment, a data packet to the control node or the access network gateway via at least one base station, where the control node is a connection control node and a mobility control node of the user equipment.

In a possible embodiment, for a unicast multi-cell communication mode, the user equipment transmits a data packet to the control node or the access network gateway via at least one base station, includes:

selecting, by the user equipment, a base station according to situations of links between the user equipment and different base stations, and transmitting the data packet to the control node or the access network gateway via the selected base station, or, replicating, by the user equipment, the data packet, performing header compression and encryption processing on each replicated data packet, and transmitting each replicated data packets to each base station, respectively, where each data packet is transmitted to a base station, or, performing, by the user equipment, header compression and encryption processing on the data packet received, then segmenting the received data packet, and transmitting each segment of the data packet to a base station, where each segment of the data packet is transmitted to a base station.

In a possible embodiment, receiving, by the user equipment, a data packet transmitted from a control node or an access network gateway via at least one base station, includes: when the user equipment receives multiple segments of the data packet from the control node and the access network gateway via multiple base stations, then performing, by the user equipment, combination processing on the received multiple segments of the data packet and obtaining the whole data packet.

A control node for transmitting a data packet according to embodiments of the present invention, including:

a first transmission module, configured to transmit a data packet from at least one base station to an access network gateway or a core network gateway; and a second transmission module, configured to transmit a data packet from the access network gateway or the core network gateway to at least one base station, where the control node is a connection control node and a mobility control node of a user equipment.

In a possible embodiment, the control node further includes:

a first processing module, configured to maintain and protect the connection between the control node and the user equipment, and to maintain the connection status of the user equipment.

In a possible embodiment, the control node further includes:

a second processing module, configured to maintain and store location information of the user equipment, and to update the stored location information of the user equipment when the location information of the user equipment has changed.

In a possible embodiment, the control node further includes:

a third processing module, configured to authenticate the user equipment's identity via an interface between the control node and a core network subscription and authentication entity, and to allocate a temporary user equipment identification which is unique in a system to the user equipment which is authenticated and is attached to the network.

In a possible embodiment, the control node further includes:

a fourth processing module, configured to perform local gateway selection of a user plane after having established interface(s) with local gateway(s), and to perform core network gateway selection of the user plane after having established interface(s) with core network gateway(s).

In a possible embodiment, the second transmission module is specifically configured to:

for a unicast single-cell communication mode, forward the data packet from the access network gateway or the core network gateway to a base station;

for a unicast multi-cell communication mode or a broadcast communication mode, transmit the data packet from the access network gateway or the core network gateway to at least one base station.

In a possible embodiment, the second transmission module is specifically configured to:

for the unicast multi-cell communication mode, repeatedly transmit the data packet from the access network gateway or the core network gateway to at least two base stations; or replicate the received data packet, perform header compression and encryption processing on each replicated data packet, and transmit each replicated data packet to each base station, respectively, where each data packet is transmitted to a base station, or perform header compression and encryption processing on the received data packet, then segment the received data packet, and transmit each segment of the data packet to a base station, where each segment of the data packet is transmitted to a base station, or select a base station on the basis of situations of links between different base stations and the user equipment, and transmit the data packet from the access network gateway or the core network gateway to the selected base station; and for a broadcast communication mode, replicate the received data packet and transmit each replicated data packet to each base station, where each data packet is transmitted to one base station.

In a possible embodiment, the first processing module is specifically configured to:

for the unicast single cell communication mode, transmit the data packet from one base station to the access network gateway or the core network gateway;

for the unicast multi-cell communication mode, perform combination processing on the data packet from at least one base station and transmit the data packet to the network gateway or the core network gateway.

In a possible embodiment, the control node transmits a data packet with a base station via Xn interface application protocol, and, the control node performs authentication, authorization, connection management, mobility management and session management of the user equipment through air interface high-level protocol.

A base station for transmitting a data packet according to embodiments of the present invention, the base station including:

a third transmission module, configured to transmit a data packet from a control node or an access network gateway to a user equipment, and a fourth transmission module, configured to transmit a data packet from the user equipment to the control node or the access network gateway;

where the control node is a connection control node and a mobility control node of the user equipment.

In a possible embodiment, the third transmission module is specifically configured to:

when performing multi-cell joint transmission, transmit the data packet from the control node or the access network gateway to the user equipment according to transmission parameter(s) obtained from the control node, and transmit the data packet from the user equipment to the control node or the access network gateway according to transmission parameter(s) obtained from the control node;

when performing single-cell transmission, transmit the data packet from the control node or the access network gateway to the user equipment via self-scheduled transmission resource(s), and transmit the data packet from the user equipment to the control node or the access network gateway via self-scheduled transmission resource(s).

In a possible embodiment, transmission resource(s) scheduled by the third transmission module is different from resource(s) used for multi-cell joint transmission.

In a possible embodiment, the base station performs data packet transmission with the control node via Xn interface application protocol.

A user equipment for transmitting a data packet according to embodiments of the present invention, the user equipment including:

a receiving module, configured to receive a data packet transmitted from a control node or an access network gateway via at least one base station, and a transmitting module, configured to transmit a data packet to the control node or the access network gateway via at least one base station, where the control node is a connection control node and a mobility control node of the user equipment.

In a possible embodiment, the receiving module is specifically configured to:

for a unicast multi-cell communication mode, select a base station according to situations of links between the user equipment and different base stations, and transmit the data packet to the control node or the access network gateway via the selected base station, or, replicate the data packet, perform header compression and encryption processing on each replicated data packet, and transmit each replicated data packet to each base station, respectively, where each data packet is transmitted to a base station, or, perform header compression and encryption processing on the received data packet, then segment the received data packet, and transmit each segment of the data packet to a base station, where each segment of the data packet is transmitted to a base station.

In a possible embodiment, the receiving module is specifically configured to:

when receiving multiple segments of the data packet from the control node and the access network gateway via multiple base stations, then perform combination processing on the received multiple segments of the data packet and obtain the whole data packet.

A communication system according to embodiments of the present invention, the communication system includes an access network, a core network and a user equipment;

where the access network includes at least one control node according to embodiments of the present invention, at least one access network gateway and at least one base station;

the core network includes a core network subscription and authentication entity and a core network gateway; and the control node connects with the at least one base station, the at least one access network gateway, the core network subscription and authentication entity and the core network gateway.

A control node according to embodiments of the present invention, the control node including:

a processor, configured to read instructions stored in a memory to perform the following operations:

transmitting a data packet from at least one base station to an access network gateway or a core network gateway via a transceiver; and transmitting a data packet from the access network gateway or the core network gateway to at least one base station via the transceiver, where the control node is a connection control node and a mobility control node of a user equipment; and a transceiver, configured to receive and transmit data under the control of the processor.

In a possible embodiment, the processor is configured to perform the following operations:

maintaining and protecting the control node's connection with the user equipment and maintaining the connection status of the user equipment.

In a possible embodiment, the processor is configured to perform the following operations:

maintaining and storing location information of the user equipment, and updating the stored location information of the user equipment after the location information of the user equipment has changed.

In a possible embodiment, the processor is configured to perform the following operations:

authenticating the user equipment's identity via an interface between the control node and a core network subscription and authentication entity, and allocating a temporary user equipment identification which is unique in a system to the user equipment which is authenticated and is attached to the network.

In a possible embodiment, the processor is configured to perform the following operations:

after having established interface(s) with local gateway(s), performing local gateway selection of a user plane, and after having established interface(s) with core network gateway(s), performing core network gateway selection of the user plane.

In a possible embodiment, the processor is specifically configured to perform the following operations:

for a unicast single-cell communication mode, forwarding the data packet from the access network gateway or the core network gateway to one base station;

for a unicast multi-cell communication mode or a broadcast communication mode, transmitting the data packet from the access network gateway or the core network gateway to at least one base station.

In a possible embodiment, the processor is specifically configured to perform the following operations:

for the unicast multi-cell communication mode, repeatedly transmitting the data packet from the access network gateway or the core network gateway to at least two base stations; or replicating the received data packet, performing header compression and encryption processing on each replicated data packet, and then transmitting each replicated data packet to each base station, respectively, where each data packet is transmitted to a base station, or performing header compression and encryption processing on the received data packet, then segmenting the received data packet, and transmitting each segment of the data packet to a base station, where each segment of the data packet is transmitted to a base station, or, selecting a base station on the basis of situations of links between different base stations and the user equipment, and transmitting the data packet from the access network gateway or the core network gateway to the selected base station;

for a broadcast communication mode, replicating the received data packet and transmitting each replicated data packet to each base station, where each data packet is transmitted to one base station.

In a possible embodiment, the processor is specifically configured to perform the following operations:

for the unicast single cell communication mode, transmitting the data packet from one base station to the access network gateway or the core network gateway;

for the unicast multi-cell communication mode, performing combination processing on the data packet from at least one base station and transmitting the data packet to the network gateway or the core network gateway.

In a possible embodiment, the control node transmits a data packet with a base station via Xn interface application protocol, and, the control node realizes authentication, authorization, connection management, mobility management and session management of the user equipment through air interface high-level protocol.

A base station according to embodiments of the present invention, the base station including:

a processor, configured to read instructions stored in a memory to perform the following operations:

transmitting a data packet from a control node or an access network gateway to a user equipment via a transceiver, and transmitting a data packet from the user equipment to the control node or the access network gateway via the transceiver;

where the control node is a connection control node and a mobility control node of the user equipment.

In a possible embodiment, the processor is specifically configured to perform the following operations:

when performing multi-cell joint transmission, transmitting the data packet from the control node or the access network gateway to the user equipment according to transmission parameter(s) obtained from the control node, and transmitting the data packet from the user equipment to the control node or the access network gateway according to transmission parameter(s) obtained from the control node;

when performing single-cell transmission, transmitting the data packet from the control node or the access network gateway to the user equipment via self-scheduled transmission resource(s), and transmitting the data packet from the user equipment to the control node or the access network gateway via self-scheduled transmission resource(s).

In a possible embodiment, transmission resource(s) scheduled by the processor is different from resource(s) used for multi-cell joint transmission.

In a possible embodiment, the base station performs data packet transmission with the control node via Xn interface application protocol.

A user equipment according to embodiments of the present invention, the user equipment including:

a processor, configured to read instructions stored in a memory to perform the following operations:

receiving via a transceiver a data packet transmitted from a control node or an access network gateway via at least one base station, and transmitting via the transceiver a data packet to the control node or the access network gateway via at least one base station;

where the control node is a connection control node and a mobility control node of the user equipment; and a transceiver, configured to receive and transmit data under the control of the processor.

In a possible embodiment, the processor is specifically configured to perform the following operations:

for a unicast multi-cell communication mode, selecting a base station according to situations of links between the user equipment and different base stations, and transmitting the data packet to the control node or the access network gateway via the selected base station, or, replicating the data packet, performing header compression and encryption processing on each replicated data packet, and transmitting each replicated data packet to each base station, respectively, where each data packet is transmitted to a base station, or, performing header compression and encryption processing on the received data packet, then segmenting the received data packet, and transmitting each segment of the data packet to a base station, where each segment of the data packet is transmitted to a base station.

In a possible embodiment, the processor is specifically configured to perform the following operations:

when receiving multiple segments of the data packet from the control node and the access network gateway via multiple base stations, then performing combination processing on the received multiple segments of the data packet and obtaining the whole data packet.

In the embodiments of the present application, a control node transmits a data packet from at least one base station to an access network gateway or a core network gateway, and transmits a data packet from the access network gateway or the core network gateway to at least one base station, where the control node is a connection control node and a mobility control node of a user equipment. In the new network architecture proposed by the embodiments of the present invention, control plane signaling process of the core network is greatly simplified; therefore, control delay and traffic pressure on the backhaul between the access network and the core network are greatly reduced. Under the control of the control node, a transmission mode is flexibly selected at the access network side, so that requirements of different services on aspects of delay and reliability can be met.

DETAILED DESCRIPTION

In the embodiments of the present invention, a control node transmits a data packet from at least one base station to an access network gateway or a core network gateway, and transmits a data packet from the access network gateway or the core network gateway to at least one base station, where the control node is a connection control node and a mobility control node of a user equipment. In the new network architecture proposed by the embodiments of the present invention, control plane signaling process of the core network is greatly simplified; therefore, control delay and traffic pressure on the backhaul between the access network and the core network are greatly reduced. Under the control of the control node, a transmission mode is flexibly selected at the access network side, so that requirements of different services on delay and reliability can be met.

When the control node is introduced into the radio access network as a connection functional and mobility anchor of the user equipment, the core network removes the existing mobility management entity (MME) and the control plane protocol stack is simplified from a two-layer structure consisting of radio resource control (RRC) and a non access stratum (NAS) layer to a one-layer structure consisting of an air interface high-level protocol (for example, this high-level protocol is referred to the eRRC protocol or the enhanced RRC protocol). In the aspect of unicast, the control node is responsible for controlling transmission communication mode of the radio access network, which includes a single-cell transmission communication mode and a multi-cell joint transmission communication mode. In the aspect of broadcast/geocast, the control node supports boardcast/geocast services targeted to a specified area.

The embodiments of the present invention will now be described in further detail with reference to the accompanying drawings.

Figure 1:
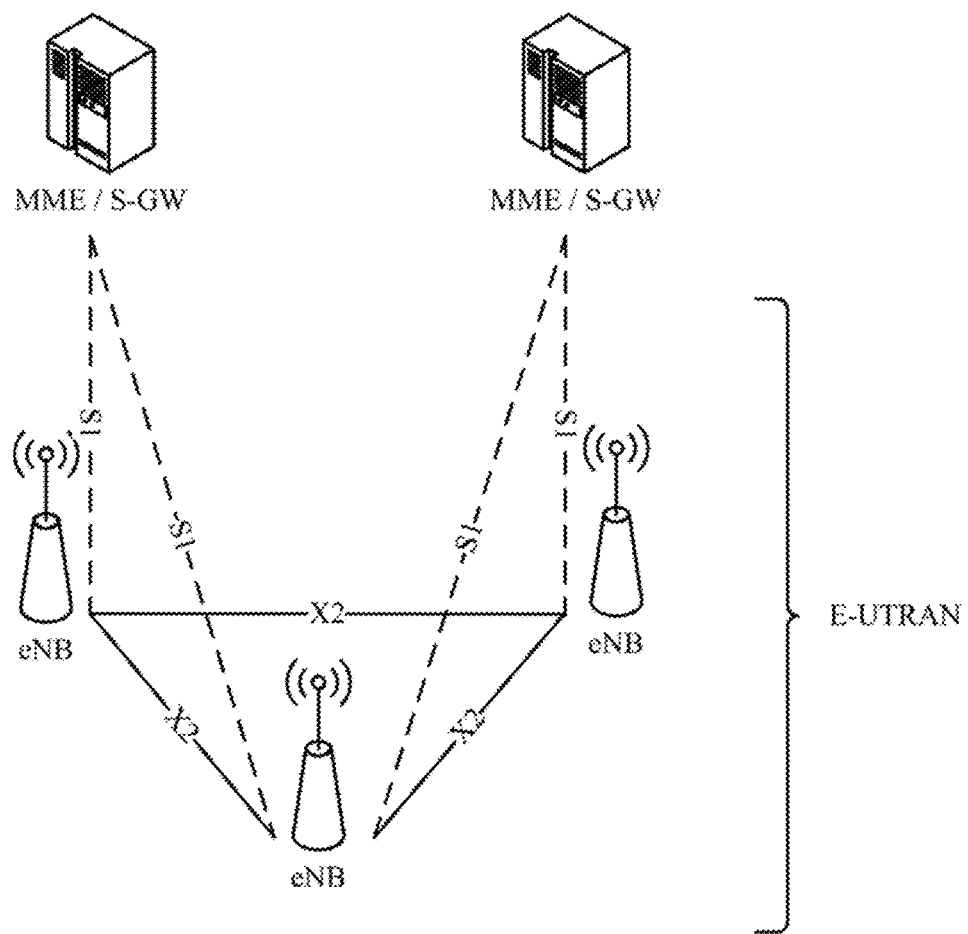
FIG. 1 is a schematic diagram of an LTE system architecture in the prior art.
Figure 2:
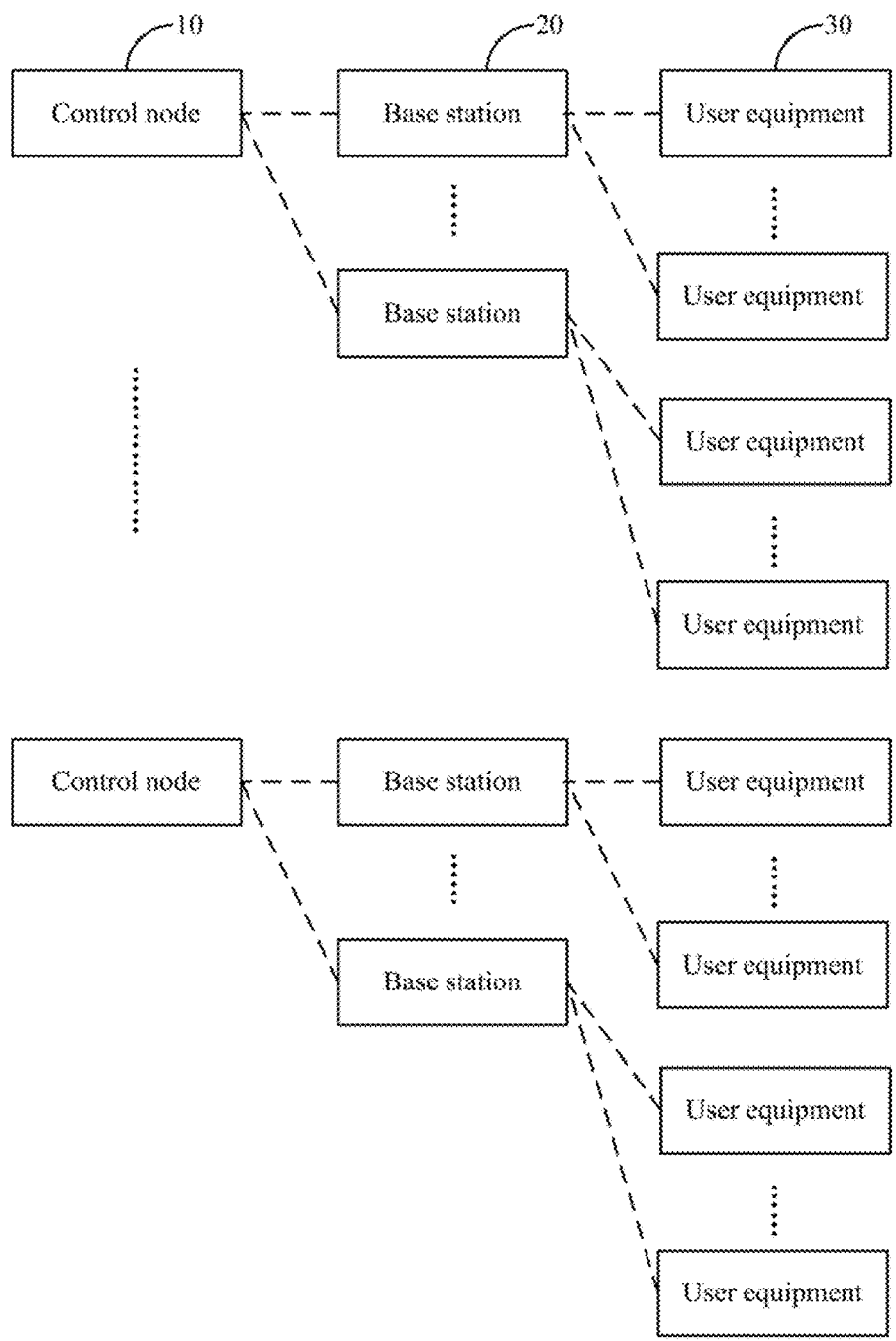
FIG. 2 is a schematic structural diagram of a system for transmitting a data packet in accordance with the first embodiment of the invention.

As illustrated in FIG. 2, a system for transmitting a data packet according to the first embodiment of the present invention includes at least one control node 10, at least one base station 20 and at least one user equipment 30, where a control node 10 is connected with at least one base station 20, a base station 20 is connected with a control node 10.

A control node 10 is configured to transmit a data packet from at least one base station to an access network gateway or a core network gateway; and to transmit a data packet from an access network gateway or a core network gateway to at least one base station, where the control node is a connection control node and a mobility control node of a user equipment.

A base station 20 is configured to transmit a data packet from a control node or an access network gateway to a user equipment and transmit a data packet from the user equipment to the control node or the access network gateway.

A user equipment 30 is configured to receive a data packet from a control node or an access network gateway via at least one base station and transmit a data packet to the control node or the access network gateway.

According to embodiments of the present invention, the connection establishment (that is, attaching to a network) process, includes authenticating a user equipment's identity, allocating a temporary identification for the user equipment and storing information of the cell and the serving base station the user equipment is currently accessing. The connection maintenance process includes, after the user equipment has moved across cells, storing updated information of the cell and the serving base station the user equipment is accessing. Moreover, a control node controls a user equipment to transmit status update message periodically. After the control node has received a status update message, it updates the status information of the user equipment (for example, the connection is valid); if no status update message is received within a preset time period, it is assumed that the user equipment's connection is implicitly released (for example, the user equipment has moved to a scene which is not covered by any network). If the user equipment is actively shut down, the user equipment initiates a connection release (detaching to a network) process before shutdown, the control node releases the temporary identification allocated for the user equipment as well as location information and status information, where the temporary identification allocated for the user equipment as well as the location information and status information could be stored together in "user equipment context".

The solutions of the present invention are described below with respect to the non-access layer and the access layer.

1. Non-Access Layer Function Aspect

Optionally, a control node, as a connection anchor from a user equipment to network side, is responsible for maintaining and protecting the connection between the control node and the user equipment and maintaining the user equipment's connection status.

Here the maintenance of location information is part of the connection maintenance's function, that is, the user equipment establishes a connection after attaching to the network and informs the control node by triggering signaling process after it has moved across cells.

Specifically, when updating location information of the user equipment, the location information could be directly reported to the control node by the user equipment, or a serving base station of the user equipment could inform the control node of the location information.

The control node, as a mobility anchor of the user equipment is responsible for managing the mobility of the user equipment, maintaining and storing location information of the user equipment and updating stored location information of the user equipment when the location information of the user equipment has changed.

The control node authenticates the user equipment's identity via an interface between the control node and a core network subscription and authentication entity (Home Subscriber Server (HSS), or, Home Location Register (HLR)) or between the control node and an Authentication, Authorization and Accounting (AAA server).

The control node is responsible for allocating a temporary user equipment identification (UE ID) which is unique in the system for the user equipment if the user equipment is authenticated, after the user equipment attaches to the network, and is responsible for managing the connection status and mobility of the user equipment.

Optionally, the control node performs local gateway selection of user plane when it has established an interface with a local gateway.

According to embodiments of the present invention, several existing methods could be adopted to select a gateway for the user equipment. One method is that the network stores a "Default Access Point Name (Default APN)", during the process of the user equipment attaching to the network, an MME (an existing entity responsible for gateway selection in a existing network) could search for selectable gateways according to APNs and select a gateway from the selectable gateways. Another method is that when the user equipment is accessing the network, it carries an APN, and the network selects a gateway for the user equipment according to the APN reported by the user equipment. These two methods could be used together. For whether to select a core network gateway or an access network local gateway, one scheme is that an APN carries a field such as ".global" or ".local" to assist with the search.

The control node establishes an interface with a local gateway (L-GW) to complete the function of location gateway selection of user plane. The function of a local gateway (L-GW) includes a function of routing a data packet of the local network in uplink direction, and in downlink direction, determining a next hop node according to destination address carried by a downlink data packet (the destination address is configured to identify a specific user equipment) and forwarding the data packet to the next hop node (for example, forwarding to a base station).

Optionally, after having established an interface with a core network gateway, the control node performs core network gateway selection of user plane.

Specifically, the control node establishes an interface with a core network gateway to complete the function of core network gateway selection of user plane. The function of a core network gateway (C-GW) includes a function of routing a data packet of the core network in uplink direction (for example, communicating with a remote counterpart), and in downlink direction, determining a next hop node according to destination address carried by a downlink data packet (the destination address is configured to identify a specific user equipment) and forwarding the data packet to the next hope node (for example, forwarding to a base station).

The control node selects transmission communication mode according to service type and reliability requirements, including unicast single-cell transmission communication mode, unicast multi-cell transmission communication mode and broadcast transmission communication mode.

Optionally, if the broadcast communication mode is selected, the control node could also select between broadcast communication mode based on single-cell transmission or broadcast communication mode based on multi-cell joint transmission according to self-stored UE location information.

2. Access Layer Function Aspect

In situations of the unicast multi-cell transmission and the broadcast transmission, the control node is responsible for coordinating data transmission resources of multiple cells to realize multi-cell joint transmission.

In situation of unicast single-cell transmission, a base station is responsible for allocating radio resources for single-cell transmission.

Figure 3:
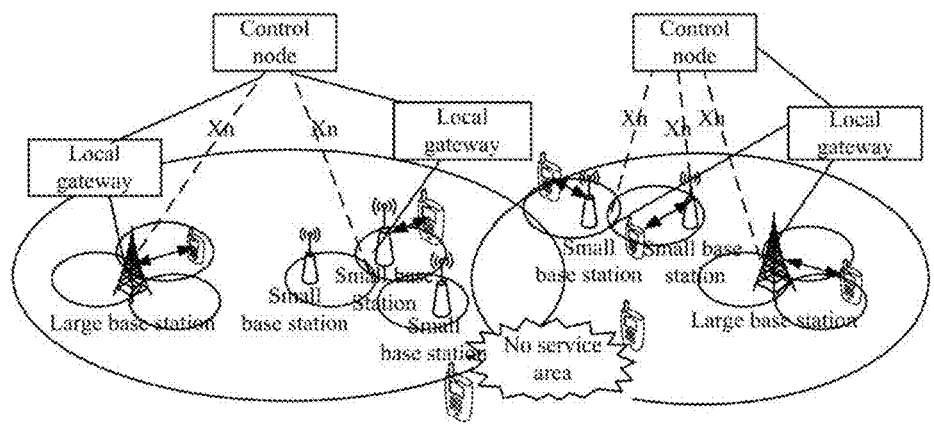
FIG. 3 is a schematic diagram of a first network topology in accordance with some embodiments of the invention.

According to embodiments of the present invention, a plurality of control nodes responsible for managing user equipment accessing different geographic areas might exist in a radio access network, and for a base station in the area of a specific control node, the base station establishes an interface with only one control node. A control node could establish Xn interfaces with a plurality of base stations, where every base station could manage one or multiple cells. An area controlled by a control node can't be seamlessly covered by network, a base station could be deployed in a specific area when needed, for example, a factory area or an emergency scene, and a user equipment could only obtain services in a cell's coverage area, for whose details please refer to the FIG. 3.

Figure 4:
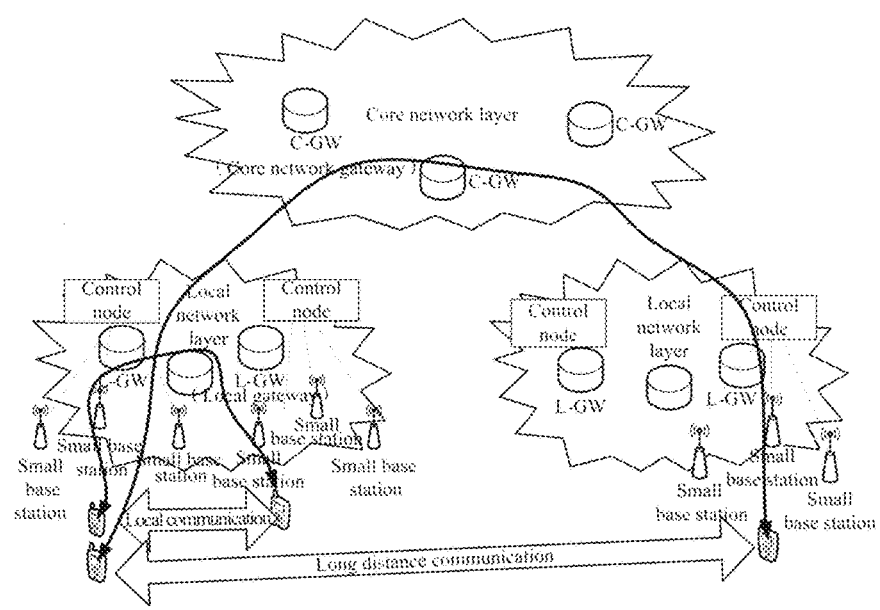
FIG. 4 is a schematic diagram of a second network topology in accordance with some embodiments of the invention.

A control node and a local gateway (Local GW) constitute a local network layer of a data plane, and communications among user equipments realizes local data routing via a "local network layer" constituted by a local gateway. A core network gateway (C-GW) constitutes a core network layer of a data plane, and for long distance communication among user equipments, long distance data routing is realized via a "core network layer", where data is forwarded to the core network layer from the access network layer of a source UE and is forwarded to the local network layer of a destination UE from the core network layer, for whose details please refer to FIG. 4.

Figure 5:
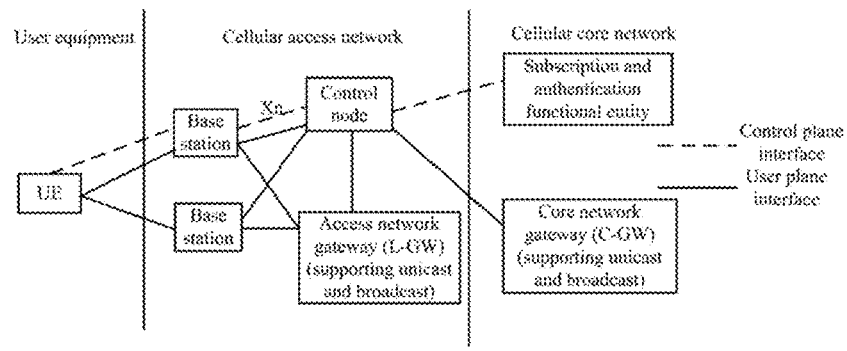
FIG. 5 is a schematic diagram of a network architecture hierarchy in accordance with some embodiments of the present invention.

As illustrated in FIG. 5, a new cellular network architecture according to embodiments of the present invention includes three parts, an access network (could also be referred to as cellular access network), a core network (could also be referred to as cellular core network) and a user equipment;

where the access network includes at least one control node, at least one access network gateway and at least one base station;

the core network includes a core network subscription and authentication entity and a core network gateway;

the control node connects to at least one base station, at least one access network gateway, the core network subscription and authentication entity and the core network gateway.

A user equipment could be a mobile phone, a vehicle user equipment, or a machine terminal equipped with a sensor.

A cellular access network includes a base station, a control node and a local gateway of the access network, where the base station could be a macro base station for outdoor wide range or a small base station for indoor user, one or multiple control nodes and one or multiple local gateways constitutes a local network layer.

A cellular core network includes a subscription and authentication functional entity and a core network gateway (C-GW), where the subscription and authentication functional entity is configured to store subscription and authentication information of a user equipment, and the core network gateway is responsible for data routing of a user equipment's long-distance communication.

In practice, both a local gateway (Local GW) and a core network gateway (C-GW) support functions of unicast and broadcast/geocast.

Figure 6:
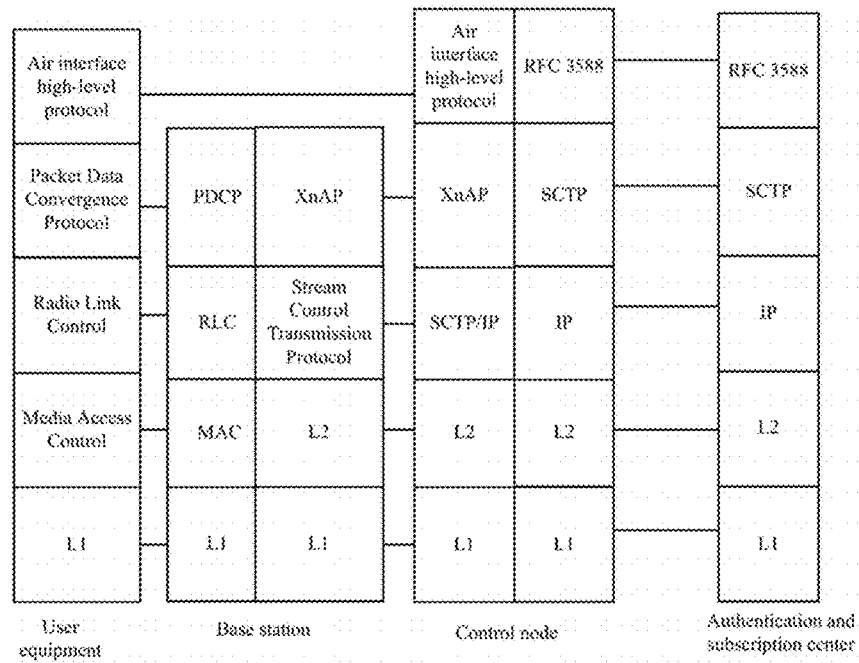
FIG. 6 is a schematic diagram of a control plane protocol stack in accordance with some embodiments of the present invention.

For a control plane protocol stack according to embodiments of the present invention, please refer to FIG. 6, where the RFC 3588 protocol is also referred to as Diameter protocol. In FIG. 6, an Xn interface is established between a base station and a control node, and information exchange between the base station and the control node is realized through Xn interface application protocol. The control node performs authentication, authorization, connection management, mobility management and session management (functions such as connection establishment, network attachment, status update, session establishment, and bearer update) of a user equipment through air interface high-level protocol. An interface between the control node as well as the authentication and subscription center is configured to authenticate the identity and subscription information of the user equipment when the user equipment is attaching to the network.

The Xn interface application protocol, that is XnAP, refers to an interface protocol between a base station and a control node, and the interface between a base station and a control node is referred to as an Xn interface.

The network architecture according to embodiments of the present invention could realize data transmission in various communication modes, such as a unicast single-cell communication mode (specifically including two kinds of modes: a unicast single-cell local gateway communication mode and a unicast single-cell core network gateway communication mode), a unicast multi-cell multi-base station communication mode and a broadcast communication mode, which would be described below with examples.

1. The Unicast Single-Cell Local Gateway Communication Mode

Figure 7A:
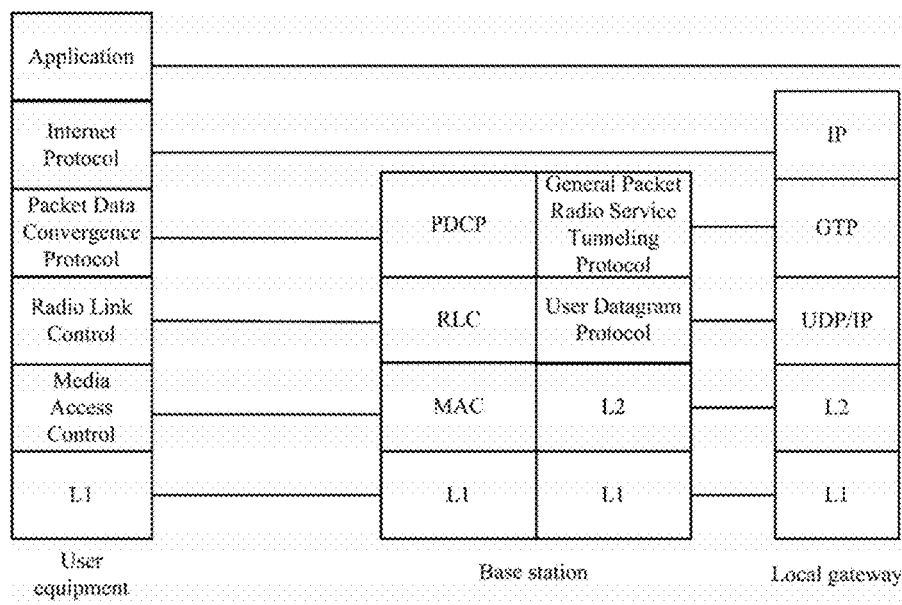
FIG. 7A is a schematic diagram of a user plane protocol stack for a unicast single-cell local gateway communication mode in accordance with some embodiments of the present invention.

FIG. 7A illustrates the user plane protocol stack in this communication mode.

Figure 7B:
FIG. 7B is a schematic diagram of a transmission procedure of a unicast single-cell local gateway communication mode in accordance with some embodiments of the present invention.

In the local unicast single-cell communication mode of a user equipment, downlink data is directly transmitted to a base station from a local gateway, and is forwarded to the user equipment by the base station, for whose details please refer to FIG. 7B.

Uplink data is transmitted to the base station by the user equipment and is forwarded to the local gateway by the base station, whose specific process is opposite to FIG. 7B.

2. The Unicast Single-Cell Core Network Gateway Communication Mode

For downlink, the control node forwards a data packet from an access network gateway or a core network gateway to a base station.

For uplink, the control node forwards a data packet from a base station to the access network gateway or the core network gateway.

Figure 8A:
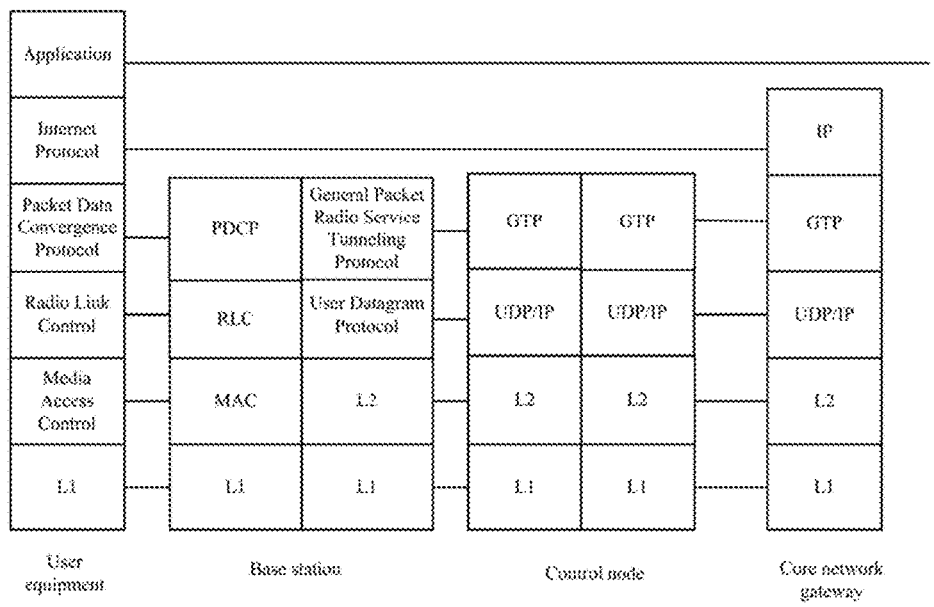
FIG. 8A is a schematic diagram of a user plane protocol stack for a unicast single-cell core network gateway communication mode in accordance with some embodiments of the present invention.

Please refer to FIG. 8A for the user plane protocol stack in this communication mode.

Figure 8B:
FIG. 8B is a schematic diagram of a transmission process of a unicast single-cell core network gateway communication mode in accordance with some embodiments of the present invention.

Specifically, in a situation of long distance communication, the user equipment could use the unicast single-cell communication mode, where downlink data is transmitted to the control node from the core network gateway, forwarded to the base station by the control node and forwarded to the user equipment by the base station, for whose details please refer to FIG. 8B.

Uplink data is transmitted to the base station from the user equipment, forwarded to the control node by the base station and finally forwarded to the core network gateway by the control node, whose specific process is opposite to FIG. 8B.

As the number of control nodes in a cellular cell is far smaller than the number of base stations, the number of connections that are required to be established between a core network gateway and an access network apparatus could be greatly reduced, which reduces burdens of the core network gateway in the aspect of connection maintenance.

3. The Unicast Multi-Cell Multi-Base Station Communication Mode

Apart from the unicast single-cell transmission communication mode, a control node could also coordinate a plurality of base stations to support a user equipment to perform the unicast multi-cell communication mode, where in the unicast multi-cell communication mode, the user equipment could establish connections with multiple base stations.

When multipath redundant transmission mode is used, in a unicast multi-cell transmission communication mode, in downlink direction, the control node performs replication, header compression, encryption processing and segmentation on a data packet from a local or core network gateway, and transmits the replicated data packets to base stations which participates in multi-cell transmission, the base stations transmit the data packets obtained from the control node to the user equipment at air interfaces, the user equipment combines downlink data transmission from multiple base stations to restore a unicast data packet. In uplink direction, the user equipment first obtains a list of base stations designed for uplink multi-cell transmission according to configuration of the control node, performs replication, header compression, encryption processing and segmentation on a data packet and then transmits the replicated data packets to base stations participating in multi-cell transmission, the base stations transmit the data packets obtained from the UE to the control node at air interfaces, the control node combines uplink data transmission from multiple base stations and restores a unicast data packet.

Figure 9A:
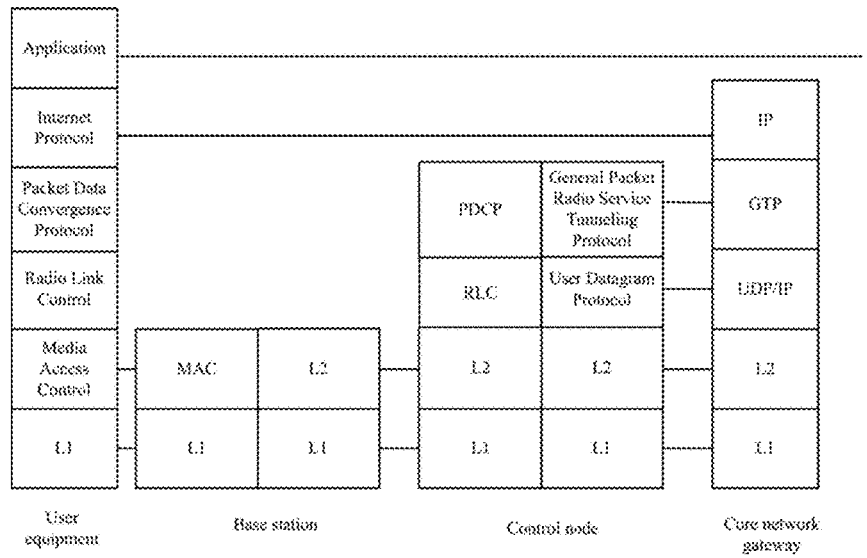
FIG. 9A is a schematic diagram of a user plane protocol stack for a unicast multi-cell multi-base station communication mode in accordance with some embodiments of the present invention.

FIG. 9A is the user plane protocol stack in this communication mode.

For downlink transmission, the control node transmits a data packet from an access network gateway or a core network gateway to at least one base station.

Figure 9B:
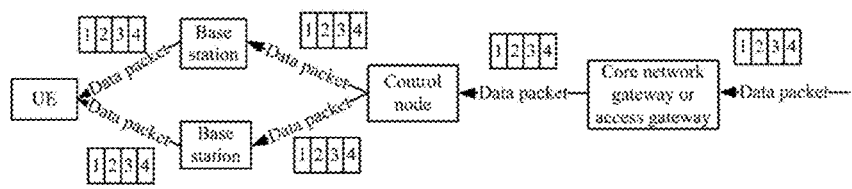
FIG. 9B is a schematic diagram of the transmission of a first unicast multi-cell multi-base station communication mode in accordance with some embodiments of the present invention.
Figure 9C:
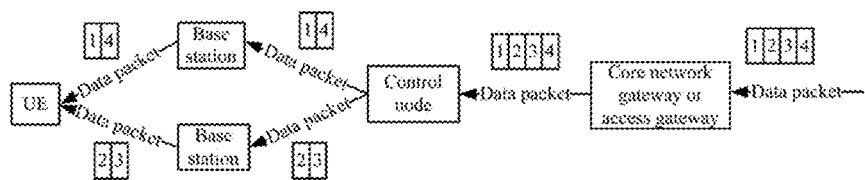
FIG. 9C is a schematic diagram of the transmission of a second unicast multi-cell multi-base station communication mode in accordance with some embodiments of the present invention.

Specifically, the control node transmits a data packet from an access network gateway or a core network gateway repeatedly to at least two base station, for the details of which please refer to FIG. 9B, or the control node replicates a received data packet, performs header compression and encryption processing on each replicated data packet, and then transmits each replicated data packet to each base station, respectively, where each data packet is transmitted to a base station; or performs header compression, encryption processing and then segmentation processing on a received data packet, and transmits each segment of the data packet to a base station, where each segment of the data packet is transmitted to a base station, whose details are illustrated in FIG. 9C; correspondingly, if the control node or the access network gateway transmits a data packet via multiple base stations, and if the user equipment receives multiple segments of the data packet sent by the control node or the access network gateway via multiple base stations, combines the received multiple segments of data packet and obtains the whole data packet.

Optionally, if a multipath dynamic selection communication mode is used, in downlink direction, the control node preferably selects a base station with a relatively better link to perform downlink transmission according to dynamic situations of links of different base stations to the user equipment. Specifically, the control node selects a base station according to situations between different base stations and the user equipment, and transmits a data packet from the access network gateway or the core network gateway to the selected base station.

For uplink transmission, the user equipment replicates a data packet, performs header compression and encryption processing on each replicated data packet and then transmits each replicated data packet to a base station respectively, where each data packet is transmitted to one base station, or the user equipment performs header compression, encryption processing and then segmentation processing on a received data packet, transmits each segment of the data packet to a base station, where each data packet is transmitted to one base station.

Optionally, if a multipath dynamic selection communication mode is used, in uplink direction, the user equipment preferably selects a base station with a relatively better link to perform uplink transmission according to dynamic situations of links of different base stations. Specifically, the user equipment selects a base station according to situations of links between the user equipment and different base stations, and transmits a data packet to the control node or the access network gateway via a selected base station.

Correspondingly, the control node combines data packets from at least one base station and transmits a data packet to the access network gateway or core network gateway.

4. Broadcast Communication Mode

The network architecture according to embodiments of the present invention supports both unicast service for a specific user equipment and broadcast/geocast for a specific area, where a broadcast gateway might be located in an access network or a core network. The broadcast gateway replicates a downlink internet protocol (IP) packet and transmits the replicated IP packets to a control node which covers a target area according to a broadcast area (the broadcast area covers certain geographic areas), after the control node obtains the downlink IP packets, it replicates the IP packets and forwards the replicated IP packets to all the base stations under the control of the control node and the base stations broadcasts the IP packets within cells via air interface broadcast channels.

Figure 10A:
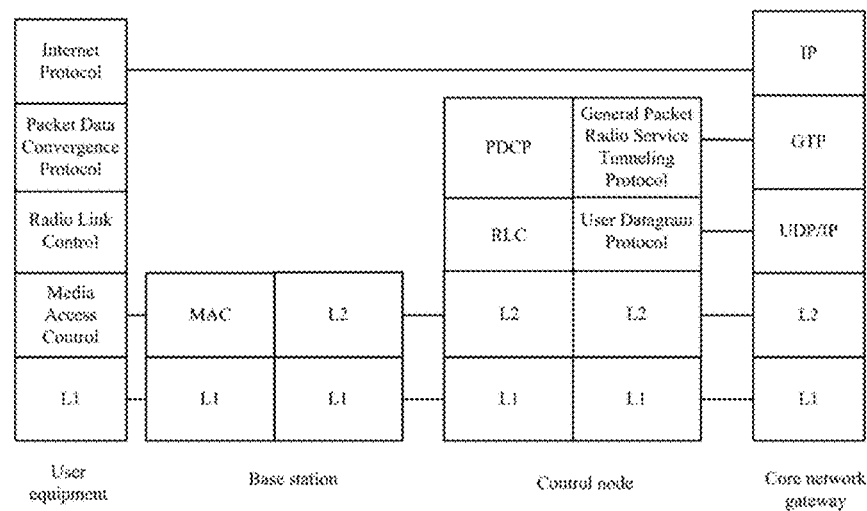
FIG. 10A is a schematic diagram of a broadcast user plane protocol stack in accordance with some embodiments of the present invention.

FIG. 10A illustrates the user plane protocol stack in this communication mode.

Figure 10B:
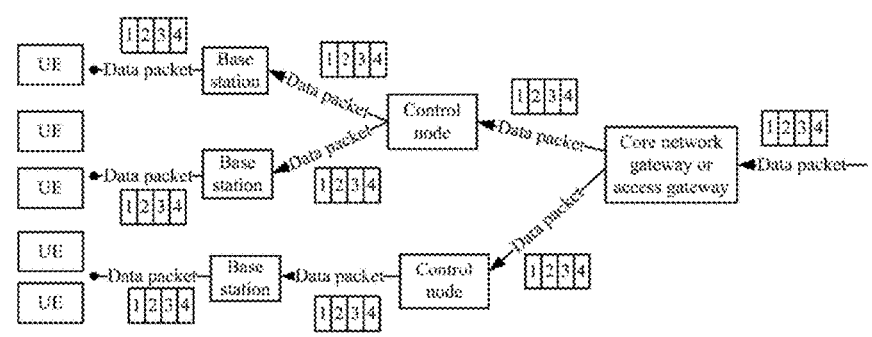
FIG. 10B is a schematic diagram of a broadcast transmission in accordance with some embodiments of the present invention.

The control node replicates a received data packet, transmits each replicated data packet to a base station where each data packet is transmitted to one base station, the details of which is illustrated in FIG. 10B.

In practice, when performing multi-cell joint transmission, the base station transmits the data packet from the control node or the access network gateway to the user equipment according to transmission parameter(s) obtained from the control node, and transmits the data packet from the user equipment to the control node or the access network gateway according to transmission parameter(s) obtained from the control node;

when performing single-cell transmission, the base station transmits the data packet from the control node or the access network gateway to the user equipment via self-scheduled transmission resource(s), and transmits the data packet from the user equipment to the control node or the access network gateway via self-scheduled transmission resource(s).

Optionally, transmission resource(s) scheduled by the base station is different from resource(s) used for multi-cell joint transmission.

Figure 11:
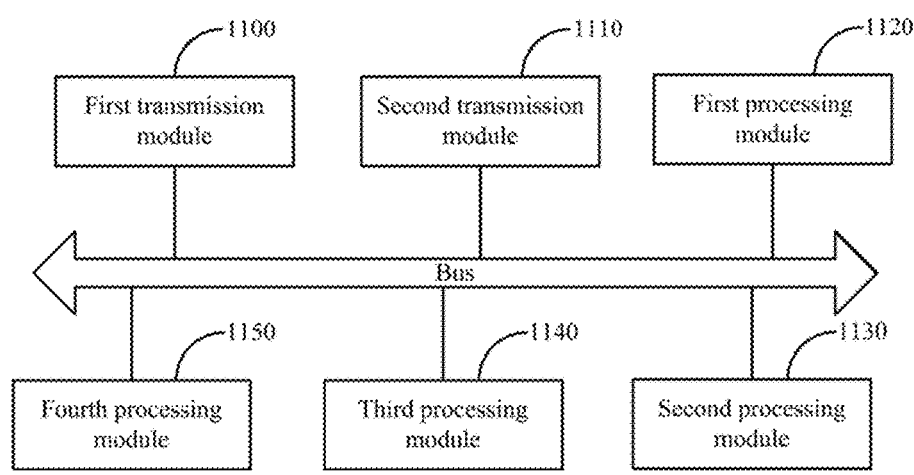
FIG. 11 is a structural schematic diagram of a control node in accordance with a second embodiment of the present invention.

As illustrated in FIG. 11, a control node according to the second embodiment includes: a first transmission module 1100 and a second transmission module 1110.

The first transmission module 1100 is configured to transmit a data packet from at least one base station to an access network gateway or a core network gateway; and the second transmission module 1110 is configured to transmit a data packet from the access network gateway or the core network gateway to at least one base station, where the control node is a connection control node and a mobility control node of a user equipment.

Optionally, the control node further includes:

a first processing module 1120, configured to maintain and protect the connection between the control node and the user equipment, and to maintain the connection status of the user equipment.

Optionally, the control node further includes:

a second processing module 1130, configured to maintain and store location information of the user equipment, and to update the stored location information of the user equipment when the location information of the user equipment has changed.

Optionally, the control node further includes:

a third processing module 1140, configured to authenticate the user equipment's identity via an interface between the control node and a core network subscription and authentication entity, and to allocate a temporary user equipment identification which is unique in a system to the user equipment which is authenticated and is attached to the network.

Optionally, the control node further includes:

a fourth processing module 1150, configured to perform local gateway selection of a user plane after having established interface(s) with local gateway(s), and to perform core network gateway selection of the user plane after having established interface(s) with core network gateway(s).

Optionally, the second transmission module 1110 is specifically configured to:

for a unicast single-cell communication mode, forward the data packet from the access network gateway or the core network gateway to a base station;

for a unicast multi-cell communication mode or a broadcast communication mode, transmit the data packet from the access network gateway or the core network gateway to at least one base station.

Optionally, the second transmission module 1110 is specifically configured to:

for the unicast multi-cell communication mode, repeatedly transmit the data packet from the access network gateway or the core network gateway to at least two base stations; or replicate the received data packet, perform header compression and encryption processing on each replicated data packet, and transmit each replicated data packet to each base station, respectively, where each data packet is transmitted to a base station, or perform header compression and encryption processing on the received data packet, then segment the received data packet, and transmit each segment of the data packet to a base station, where each segment of the data packet is transmitted to a base station, or select a base station on the basis of situations of links between different base stations and the user equipment, and transmit the data packet from the access network gateway or the core network gateway to the selected base station;

for a broadcast communication mode, replicate the received data packet and transmit each replicated data packet to each base station, where each data packet is transmitted to one base station.

Optionally, the first transmission module 1100 is specifically configured to:

for the unicast single cell communication mode, transmit the data packet from one base station to the access network gateway or the core network gateway;

for the unicast multi-cell communication mode, perform combination processing on the data packet from at least one base station and transmit the data packet to the network gateway or the core network gateway.

Optionally, the control node transmits a data packet with a base station via Xn interface application protocol, and, the control node performs authentication, authorization, connection management, mobility management and session management of the user equipment through air interface high-level protocol.

Figure 12:
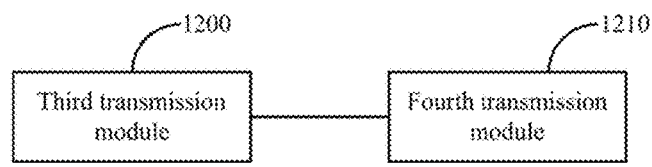
FIG. 12 is a schematic structural diagram of a base station in accordance with a third embodiment of the present invention.

As illustrated in FIG. 12, a base station according to the third embodiment of the present invention includes:

a third transmission module 1200, configured to transmit a data packet from a control node or an access network gateway to a user equipment, and a fourth transmission module 1210, configured to transmit a data packet from the user equipment to the control node or the access network gateway;

where the control node is a connection control node and a mobility control node of the user equipment.

Optionally, the third transmission module 1200 is specifically configured to:

when performing multi-cell joint transmission, transmit the data packet from the control node or the access network gateway to the user equipment according to transmission parameter(s) obtained from the control node, and transmit the data packet from the user equipment to the control node or the access network gateway according to transmission parameter(s) obtained from the control node;

when performing single-cell transmission, transmit the data packet from the control node or the access network gateway to the user equipment via self-scheduled transmission resource(s), and transmit the data packet from the user equipment to the control node or the access network gateway via self-scheduled transmission resource(s).

Optionally, transmission resource(s) scheduled by the third transmission module is different from resource(s) used for multi-cell joint transmission.

Optionally, the base station performs data packet transmission with the control node via Xn interface application protocol.

Figure 13:
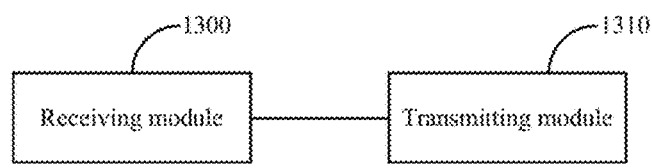
FIG. 13 is a schematic structural diagram of a user equipment in accordance with a fourth embodiment of the present invention.

As illustrated in FIG. 13, a user equipment according to the fourth embodiment of the present invention includes a receiving module 1300 and a transmitting module 1310.

The receiving module 1300 is configured to receive a data packet transmitted from a control node or an access network gateway via at least one base station, and the transmitting module 1310 is configured to transmit a data packet to the control node or the access network gateway via at least one base station, where the control node is a connection control node and a mobility control node of the user equipment.

Optionally, the transmitting module 1310 is specifically configured to:

for a unicast multi-cell communication mode, select a base station according to situations of links between the user equipment and different base stations, and transmit the data packet to the control node or the access network gateway via the selected base station, or, replicate the data packet, perform header compression and encryption processing on each replicated data packet, and transmit each replicated data packet to each base station, respectively, where each data packet is transmitted to a base station, or, perform header compression and encryption processing on the received data packet, then segment the received data packet, and transmit each segment of the data packet to a base station, where each segment of the data packet is transmitted to a base station.

Optionally, the receiving module 1300 is specifically configured to:

when receiving multiple segments of the data packet from the control node and the access network gateway via multiple base stations, then perform combination processing on the received multiple segments of the data packet and obtain the whole data packet.

Figure 14:
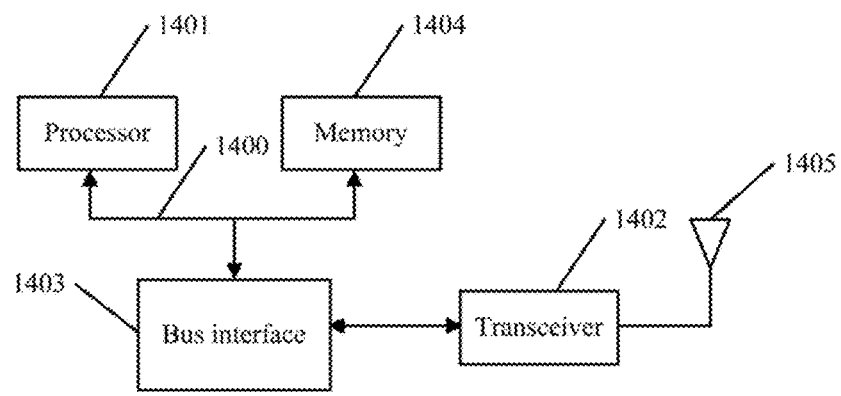
FIG. 14 is a schematic structural diagram of a control node in accordance with a fifth embodiment of the present invention.

As illustrated in FIG. 14, a control node according to the fifth embodiment of the present invention includes:

a processor 1401, configured to read instructions stored in a memory to perform the following operations:

transmitting a data packet from at least one base station to an access network gateway or a core network gateway via a transceiver 1402; and transmitting a data packet from the access network gateway or the core network gateway to at least one base station via the transceiver 1402, where the control node is a connection control node and a mobility control node of a user equipment; and a transceiver 1402, configured to receive and transmit data under the control of the processor 1401.

Optionally, the processor 1401 is configured to perform the following operations:

maintaining and protecting the control node's connection with the user equipment and maintaining the connection status of the user equipment.

Optionally, the processor 1401 is configured to perform the following operations:

maintaining and storing location information of the user equipment, and updating the stored location information of the user equipment after the location information of the user equipment has changed.

Optionally, the processor 1401 is configured to perform the following operations:

authenticating the user equipment's identity via an interface between the control node and a core network subscription and authentication entity, and allocating a temporary user equipment identification which is unique in a system to the user equipment which is authenticated and is attached to the network.

Optionally, the processor 1401 is configured to perform the following operations:

after having established interface(s) with local gateway(s), performing local gateway selection of a user plane, and after having established interface(s) with core network gateway(s), performing core network gateway selection of the user plane.

Optionally, the processor 1401 is specifically configured to perform the following operations:

for a unicast single-cell communication mode, forwarding the data packet from the access network gateway or the core network gateway to a base station;

for a unicast multi-cell communication mode or a broadcast communication mode, transmitting the data packet from the access network gateway or the core network gateway to at least one base station.

Optionally, the processor 1401 is specifically configured to perform the following operations:

for the unicast multi-cell communication mode, repeatedly transmitting the data packet from the access network gateway or the core network gateway to at least two base stations; or replicating the received data packet, performing header compression and encryption processing on each replicated data packet, and then transmitting each replicated data packet to each base station, respectively, where each data packet is transmitted to a base station, or performing header compression and encryption processing on the received data packet, then segmenting the received data packet, and transmitting each segment of the data packet to a base station, where each segment of the data packet is transmitted to a base station, or, selecting a base station on the basis of situations of links between different base stations and the user equipment, and transmitting the data packet from the access network gateway or the core network gateway to the selected base station;

for a broadcast communication mode, replicating the received data packet and transmitting each replicated data packet to each base station, where each data packet is transmitted to one base station.

Optionally, the processor 1401 is specifically configured to perform the following operations:

for the unicast single cell communication mode, transmitting the data packet from one base station to the access network gateway or the core network gateway;

for the unicast multi-cell communication mode, performing combination processing on the data packet from at least one base station and transmitting the data packet to the network gateway or the core network gateway.

Optionally, the control node transmits a data packet with a base station via Xn interface application protocol, and, the control node performs authentication, authorization, connection management, mobility management and session management of the user equipment through air interface high-level protocol.

In FIG. 14, the bus architecture is represented by a bus 1400. The bus 1400 may include any number of interconnected buses and bridges. The bus 1400 links various circuits including one or more processors represented by the processor 1401 and a memory represented by the memory 1404. The bus 1400 may also link various other circuits, such as peripherals, regulators, and power management circuits, which are well known in the art and, as such, are not further described herein. The bus interface 1403 provides an interface between the bus 1400 and the transceiver 1402.

The transceiver 1402 may be an element, or may be a plurality of elements, such as a plurality of receivers and transmitters, providing means for communicating with various other devices on transmission medium. Data processed by the processor 1401 is transmitted over wireless medium via an antenna 1405, moreover, the antenna 1405 also receives data and transmits the data to the processor 1401.

The processor 1401 is responsible for managing the bus 1400 and usual processing, and can also provide various functions including timing, a peripheral interface, voltage regulation, power management, and other control functions. And the memory 1404 may be used to store data used by the processor 1401 when performing an operation.

Optionally, the processor 1401 may be a central processing unit (CPU), an application specific integrated circuit (ASIC), a field-programmable gate array (FPGA), or a complex programmable logic device (CPLD).

Figure 15:
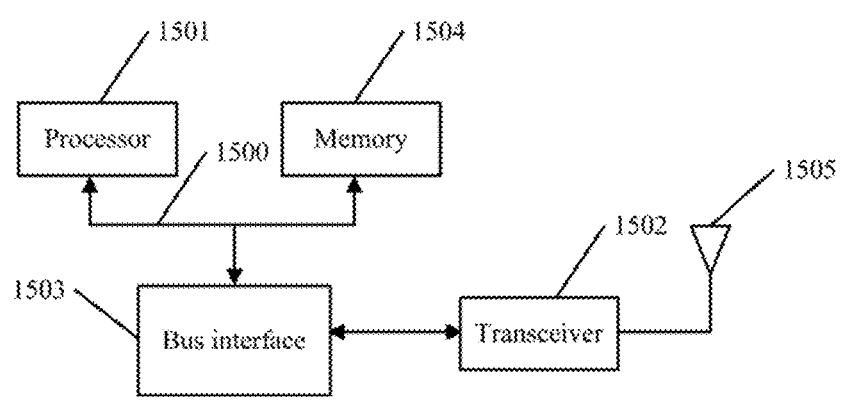
FIG. 15 is a schematic structural diagram of a base station in accordance with a sixth embodiment of the present invention.

As illustrated in FIG. 15, a base station according to the sixth embodiment of the present invention includes:

a processor 1501, configured to read instructions stored in a memory 1504 to perform the following operations:

transmitting a data packet from a control node or an access network gateway to a user equipment via a transceiver 1502, and transmitting a data packet from the user equipment to the control node or the access network gateway via the transceiver 1502;

where the control node is a connection control node and a mobility control node of the user equipment;

a transceiver 1502, configured to receive and transmit data under the control of the processor 1501.

Optionally, the processor 1501 is specifically configured to perform the following operations:

when performing multi-cell joint transmission, transmitting the data packet from the control node or the access network gateway to the user equipment according to transmission parameter(s) obtained from the control node, and transmitting the data packet from the user equipment to the control node or the access network gateway according to transmission parameter(s) obtained from the control node;

when performing single-cell transmission, transmitting the data packet from the control node or the access network gateway to the user equipment via self-scheduled transmission resource(s), and transmitting the data packet from the user equipment to the control node or the access network gateway via self-scheduled transmission resource(s).

Optionally, transmission resource(s) scheduled by the processor 1501 is different from resource(s) used for multi-cell joint transmission.

Optionally, the base station performs data packet transmission with the control node via Xn interface application protocol.

In FIG. 15, the bus architecture is represented by a bus 1500. The bus 1500 may include any number of interconnected buses and bridges. The bus 1500 links various circuits including one or more processors represented by the processor 1501 and a memory represented by the memory 1504. The bus 1500 may also link various other circuits, such as peripherals, regulators, and power management circuits, which are well known in the art and, as such, are not further described herein. The bus interface 1503 provides an interface between the bus 1500 and the transceiver 1502. The transceiver 1502 may be an element, or may be a plurality of elements, such as a plurality of receivers and transmitters, providing means for communicating with various other devices on transmission medium. Data processed by the processor 1501 is transmitted over wireless medium via an antenna 1505, moreover, the antenna 1505 also receives data and transmits the data to the processor 1501.

The processor 1501 is responsible for managing the bus 1500 and usual processing, and can also provide various functions including timing, a peripheral interface, voltage regulation, power management, and other control functions. And the memory 1504 may be used to store data used by the processor 1501 when performing an operation.

Optionally, the processor 1501 may be a CPU, an ASIC, an FPGA, or a CPLD.

Figure 16:
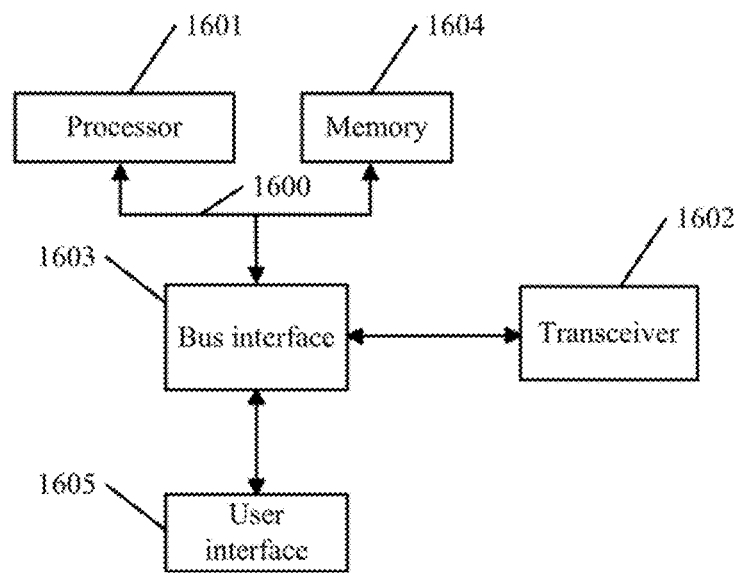
FIG. 16 is a schematic structural diagram of a user equipment in accordance with a seventh embodiment of the present invention.

According to FIG. 16, a user equipment according to the seventh embodiment of the present invention includes:

a processor 1601, configured to read instructions stored in a memory 1604 to perform the following operations:

receiving via a transceiver 1602 a data packet transmitted from a control node or an access network gateway via at least one base station, and transmitting via the transceiver 1602 a data packet to the control node or the access network gateway via at least one base station;

where the control node is a connection control node and a mobility control node of the user equipment; and a transceiver 1602, configured to receive and transmit data under the control of the processor 1601.

Optionally, the processor 1601 is specifically configured to perform the following operations:

for a unicast multi-cell communication mode, selecting a base station according to situations of links between the user equipment and different base stations, and transmitting the data packet to the control node or the access network gateway via the selected base station, or, replicating the data packet, performing header compression and encryption processing on each replicated data packet, and transmitting each replicated data packets to each base station, respectively, where each data packet is transmitted to a base station, or, performing header compression and encryption processing on the received data packet, then segmenting the received data packet, and transmitting each segment of the data packet to a base station, where each segment of the data packet is transmitted to a base station.

Optionally, the processor 1601 is specifically configured to perform the following operations:

when receiving multiple segments of the data packet from the control node and the access network gateway via multiple base stations, then performing combination processing on the received multiple segments of the data packet and obtains the whole data packet.

In FIG. 16, the bus architecture is represented by a bus 1600. The bus 1600 may include any number of interconnected buses and bridges. The bus 1600 links various circuits including one or more processors represented by the processor 1601 and a memory represented by the memory 1604. The bus 1600 may also link various other circuits, such as peripherals, regulators, and power management circuits, which are well known in the art and, as such, are not further described herein. The bus interface 1603 provides an interface between the bus 1600 and the transceiver 1602. The transceiver 1602 may be an element, or may be a plurality of elements, such as a plurality of receivers and transmitters, providing means for communicating with various other devices on transmission medium. For example, the transceiver 1602 receives external data from other devices. The transceiver 1602 is configured to transmit data processed by the processor 1601 to other devices. Depending on the nature of the computing system, a user interface 1605 may also be provided, such as a keypad, a display, a speaker, a microphone, or a joystick.

The processor 1601 is responsible for managing the bus 1600 and usual processing, such as operating a generic operating system as described above. And the memory 1604 may be used to store data used by the processor 1601 when performing an operation.

Optionally, the processor 1601 may be a CPU, an ASIC, an FPGA, or a CPLD.

Based on the same inventive conception, embodiments of the present invention also provide a method for transmitting a data packet. As the device corresponding to the method is the device in the system for transmitting a data packet according to embodiments of the present invention, and the principle of the method to solve problems is similar to the principle of the device, please refer to the implementation of the system for the implementation of the method, while would not be described again here.

Figure 17:
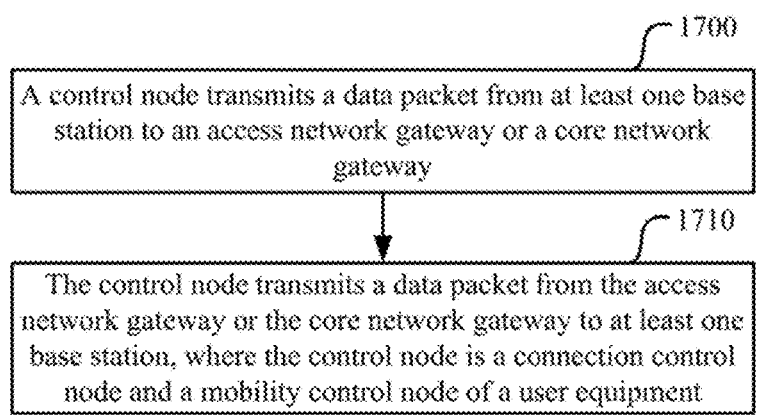
FIG. 17 is a flow chart of a method for transmitting a data packet in accordance with a eighth embodiment of the present invention.

As illustrated in FIG. 17, a method for transmitting a data packet according to the eighth embodiment of the present invention includes:

Operation 1700: a control node transmits a data packet from at least one base station to an access network gateway or a core network gateway; and Operation 1710: the control node transmits a data packet from the access network gateway or the core network gateway to at least one base station, where the control node is a connection control node and a mobility control node of a user equipment.

In practice, there is no necessarily a temporal relationship between Operation 1700 and Operation 1710, and if a data packet is received from at least one base station, Operation 1700 is triggered; if a data packet is received from the access network gateway or the core network gateway, Operation 1710 is triggered.

Optionally, the method further includes:

the control node maintains and protects its connection with the user equipment and maintains the connection status of the user equipment.

Optionally, the method further includes:

the control node maintains and stores location information of the user equipment, and updates the stored location information after the location information of the user equipment has changed.

Optionally, the method further includes:

the control node authenticates the user equipment's identity via an interface between the control node and a core network subscription and authentication entity, and allocates a temporary user equipment identification which is unique in a system to the user equipment which is authenticated and is attached to the network.

Optionally, the method further includes:

after having established interface(s) with local gateway (s), the control node performs local gateway selection of a user plane, and after having established interface(s) with core network gateway(s), the control node performs core network gateway selection of the user plane.

Optionally, the method further includes:

the control node transmits a data packet from the access network gateway or the core network gateway to at least one base station, includes:

for a unicast single-cell communication mode, the control node forwards the data packet from the access network gateway or the core network gateway to a base station;

for a unicast multi-cell communication mode or a broadcast communication mode, the control node transmits the data packet from the access network gateway or the core network gateway to at least one base station.

Optionally, for a unicast multi-cell communication mode, the control node transmits a data packet from the access network gateway or the core network gateway to at least one base station, includes:

the control node repeatedly transmits the data packet from the access network gateway or the core network gateway to at least two base stations; or the control node replicates the data packet received, performs header compression and encryption processing on each replicated data packet, and then transmits each replicated data packet to each base station, respectively, where each data packet is transmitted to a base station, or the control node performs header compression and encryption processing on the data packet received, then segments the received data packet, and transmits each segment of the data packet to a base station, where each segment of the data packet is transmitted to a base station, or, the control node selects a base station on the basis of situations of links between different base stations and the user equipment, and transmits the data packet from the access network gateway or the core network gateway to the selected base station;

for a broadcast communication mode, the control node transmits the data packet from an access network gateway or a core network gateway to at least two base stations, includes:

the control node replicates the data packet it has received and transmits each replicated data packet to each base station, where each data packet is transmitted to one base station.

Optionally, the control node transmits a data packet from at least one base station to an access network gateway or a core network gateway, includes:

for the unicast single cell communication mode, the control node transmits the data packet from one base station to the access network gateway or the core network gateway;

for the unicast multi-cell communication mode, the control node performs combination processing on the data packet from at least one base station and transmits the data packet to the network gateway or the core network gateway.

Optionally, the control node transmits a data packet with a base station via Xn interface application protocol, and, the control node performs authentication, authorization, connection management, mobility management and session management of the user equipment through air interface high-level protocol.

Figure 18:
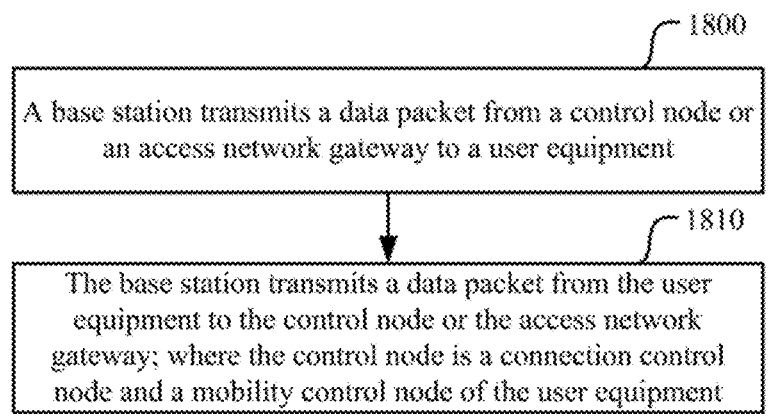
FIG. 18 is a flow chart of a method for transmitting a data packet in accordance with a ninth embodiment of the present invention.

As illustrated in FIG. 18, a method for transmitting a data packet according to the ninth embodiment of the present invention includes:

Operation 1800: a base station transmits a data packet from a control node or an access network gateway to a user equipment, and Operation 1810: the base station transmits a data packet from the user equipment to the control node or the access network gateway;

where the control node is a connection control node and a mobility control node of the user equipment.

In practice, there is no necessarily a temporal relationship between Operation 1800 and Operation 1810, and if a data packet is received from the control node or the access network gateway, Operation 1800 is triggered; if a data packet is received from the user equipment, Operation 1810 is triggered.

Optionally, the base station transmits a data packet from a control node or an access network gateway to a user equipment, includes:

when performing multi-cell joint transmission, the base station transmits the data packet from the control node or the access network gateway to the user equipment according to transmission parameter(s) obtained from the control node, and transmits the data packet from the user equipment to the control node or the access network gateway according to transmission parameter(s) obtained from the control node;

when performing single-cell transmission, the base station transmits the data packet from the control node or the access network gateway to the user equipment via self-scheduled transmission resource(s), and transmits the data packet from the user equipment to the control node or the access network gateway via self-scheduled transmission resource(s).

Optionally, transmission resource(s) scheduled by the base station is different from resource(s) used for multi-cell joint transmission.

Optionally, the base station performs data packet transmission with the control node via Xn interface application protocol.

Figure 19:
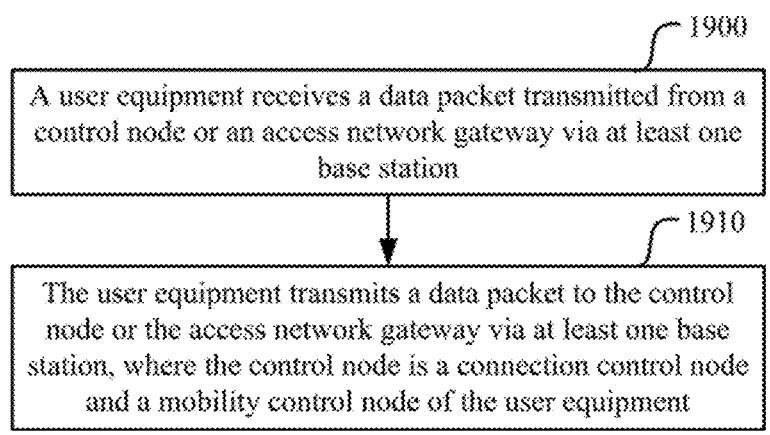
FIG. 19 is a flow chart of a method for transmitting a data packet in accordance with a tenth embodiment of the present invention.

As illustrated in FIG. 19, a method for transmitting a data packet according to the tenth embodiment includes:

Operation 1900: a user equipment receives a data packet transmitted from a control node or an access network gateway via at least one base station, and Operation 1910: the user equipment transmits a data packet to the control node or the access network gateway via at least one base station, where the control node is a connection control node and a mobility control node of the user equipment.

In practice, there is no necessarily a temporal relationship between Operation 1900 and Operation 1910, and if it is required to receive a data packet, Operation 1900 is triggered; if it is required to transmit a data packet, Operation 1810 is triggered.

Optionally, for a unicast multi-cell communication mode, the user equipment transmits a data packet to the control node or the access network gateway via at least one base station, includes:

the user equipment selects a base station according to situations of links between the user equipment and different base stations, and transmits the data packet to the control node or the access network gateway via the selected base station, or, the user equipment replicates the data packet, performs header compression and encryption processing on each replicated data packet, and transmits each replicated data packets to each base station, respectively, where each data packet is transmitted to a base station, or, the user equipment performs header compression and encryption processing on the data packet received, then segments the received data packet, and transmits each segment of the data packet to a base station, where each segment of the data packet is transmitted to a base station.

Optionally, the user equipment receives a data packet transmitted from a control node or an access network gateway via at least one base station, includes:

when user equipment receives multiple segments of the data packet from the control node and the access network gateway via multiple base stations, then the user equipment performs combination processing on the received multiple segments of the data packet and obtains the whole data packet.

It can be seen from the contents above that, in the embodiments of the present application, a control node transmits a data packet from at least one base station to an access network gateway or a core network gateway, and transmits a data packet from the access network gateway or the core network gateway to at least one base station, where the control node is a connection control node and a mobility control node of a user equipment. In the new network architecture proposed by the embodiments of the present invention, control plane signaling process of the core network is greatly simplified; therefore, control delay and traffic pressure on the backhaul between the access network and the core network are greatly reduced. Under the control of the control node, a transmission mode is flexibly selected at the access network side, so that requirements of different services on aspects of delay and reliability can be met.

It should be appreciated by those skilled in the art that embodiments of the present invention may be provided as a method, a system, or a computer program product. Therefore, the present invention may take the form of a complete hardware embodiment, a complete software embodiment, or an embodiment combing software and hardware aspects. Moreover, the present invention may take the form of a computer program product implemented in one or more computer usable storage media (including but not limited to disk storage, a CD-ROM, or an optical memory) in which computer usable program codes are included.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a data packet, comprising:
    transmitting, by a control node, a data packet from at least one base station to an access network gateway or a core network gateway; and
    transmitting, by the control node, a data packet from the access network gateway or the core network gateway to at least one base station,
    wherein the control node is a connection control node and a mobility control node of a user equipment;
    wherein the control node performs authentication, authorization, connection management, mobility management and session management of the user equipment through air interface high-level protocol.

2. The method according to claim 1, further comprising:
    maintaining and protecting, by the control node, its connection with the user equipment and maintains the connection status of the user equipment.

3. The method according to claim 1, further comprising:
    maintaining and storing, by the control node, location information of the user equipment, and updating the stored location information after the location information has changed.

4. The method according to claim 1, further comprising:
    authenticating, by the control node, the user equipment's identity via an interface between the control node and a core network subscription and authentication entity, and allocating a temporary user equipment identification which is unique in a system to the user equipment which is authenticated and is attached to the network.

5. The method according to claim 1, further comprising:
    after having established interface(s) with local gateway(s), performing, by the control node, local gateway selection of a user plane, and after having established interface(s) with core network gateway(s), performing, by the control node, core network gateway selection of the user plane.

6. The method according to claim 1, wherein transmitting, by the control node, a data packet from the access network gateway or the core network gateway to at least one base station, comprises:
    for a unicast single-cell communication mode, forwarding, by the control node, the data packet from the access network gateway or the core network gateway to one base station;
    for a unicast multi-cell communication mode or a broadcast communication mode, transmitting, by the control node, the data packet from the access network gateway or the core network gateway to at least one base station.

7. The method according to claim 6, wherein for the unicast multi-cell communication mode, transmitting, by the control node, a data packet from the access network gateway or the core network gateway to at least one base station, comprises:
    transmitting repeatedly, by the control node, the data packet from the access network gateway or the core network gateway to at least two base stations; or
    replicating, by the control node, the data packet received, performing header compression and encryption processing on each replicated data packet, and then transmitting each replicated data packet to each base station, respectively, wherein each data packet is transmitted to a base station; or performing, by the control node, header compression and encryption processing on the data packet received, then segmenting the received data packet, and transmitting each segment of the data packet to a base station, wherein each segment of the data packet is transmitted to a base station; or,
    selecting, by the control node, a base station on the basis of situations of links between different base stations and the user equipment, and transmitting the data packet from the access network gateway or the core network gateway to the selected base station;
    for a broadcast communication mode, transmitting, by the control node, the data packet from the access network gateway or the core network gateway to at least two base stations, comprises:
    replicating, by the control node, the data packet received and transmitting each replicated data packet to each base station, wherein each data packet is transmitted to a base station.

8. The method according to claim 1, wherein transmitting, by the control node, the data packet from at least one base station to the access network gateway or the core network gateway, comprises:
    for the unicast single cell communication mode, transmitting, by the control node, the data packet from one base station to the access network gateway or the core network gateway;
    for the unicast multi-cell communication mode, performing, by the control node, combination processing on the data packet from at least one base station and transmitting the data packet to the network gateway or the core network gateway.

9. The method according to claim 1, wherein the control node transmits the data packet with a base station via Xn interface application protocol.

* * * * *